United States Patent [19]

Sommer

[11] 4,183,425
[45] Jan. 15, 1980

[54] CLUTCH-BRAKE WITH SPEED DIFFERENTIAL COOLANT PUMP

[75] Inventor: Gordon M. Sommer, Grosse Pointe Farms, Mich.

[73] Assignee: G. M. Sommer Company, Inc., Warren, Mich.

[21] Appl. No.: 823,630

[22] Filed: Aug. 11, 1977

[51] Int. Cl.² .............................................. F16D 13/72
[52] U.S. Cl. .............................. 192/113 B; 192/18 A
[58] Field of Search ........... 192/113 B, 85 AA, 18 A, 192/57

[56] References Cited

U.S. PATENT DOCUMENTS

| | | | |
|---|---|---|---|
| 2,195,778 | 4/1940 | Hill | 192/85 AA |
| 2,743,792 | 5/1956 | Ransom | 192/113 B |
| 2,788,877 | 4/1957 | Richardson | 192/113 B |
| 3,696,898 | 10/1972 | Sommer | 192/18 A |
| 3,752,280 | 8/1973 | Cheek | 192/85 AA |
| 3,897,860 | 8/1975 | Borck et al. | 192/113 B |

*Primary Examiner*—Benjamin W. Wyche
*Attorney, Agent, or Firm*—Harness, Dickey & Pierce

[57] ABSTRACT

A clutch-brake unit having aligned input and output shafts, clutch plates carried by the input shaft, brake plates fixed to the housing, two series of friction discs secured to the output shaft and engageable alternately with the clutch or brake plates by means of a piston which actuates clutch and brake actuating members, and oil cooling means for the assembly including a pump, the output of which is proportional to the speed differential between the shafts. The pump is illustrated as being a Gerotor type of pump mounted between the shafts with its external element connected to the input shaft and its internal element to the output shaft.

10 Claims, 5 Drawing Figures

CLUTCH-BRAKE WITH SPEED DIFFERENTIAL COOLANT PUMP

BACKGROUND OF THE INVENTION

1. Field of the Invention

The invention relates to a combination clutch-brake unit, and more particularly to one in which the frictionally engageable clutch and brake plates and discs are at least partly immersed in a bath of oil, so that the kinetic energy produced in starting and stopping heavy loads is transmitted by "shearing" the oil between the various plates and discs. It has been found that this type of oil immersion increases the life of the friction elements over those in clutch and brake units which operate dry, and also increases the maximum operating speeds.

DESCRIPTION OF THE PRIOR ART

My U.S. Pat. No. 3,696,898 issued Oct. 10, 1972 discloses a clutch-brake unit of this general type. The housing in this prior unit holds an oil bath and its non-cylindrical interior configuration provides agitation of the oil so that it will traverse between the various torque transmitting elements. The housing interior in this previous unit was provided with oil passages, and plugged openings were provided for adding oil to the housing.

BRIEF SUMMARY OF THE INVENTION

It is an object of the present invention to provide a novel and improved clutch-brake unit of this general type which incorporates pump means for supplying oil to the frictional element in a positive manner which ensures proper oil circulation and cooling during the periods when it is most needed, namely, when the parts are relatively accelerated or decelerated.

It is a further object to provide an improved clutch-brake unit of this nature in which the output of the pump is proportional to the differential speeds between the input and output shafts and is thereby coordinated with the portions of the operating cycle which most require a large supply of circulating oil between the frictional elements.

It is another object to provide an improved clutch-brake unit having these characteristics, in which the pump and its attendant parts are incorporated within the unit in such a manner as to minimize the space required and ensure proper support for the moving parts.

Briefly, the invention comprises an oil-cooled drive assembly having a housing, input and output shafts extending from said housing, coacting drive elements within said housing between said input and output shafts, pump means for supplying cooling fluid to said drive elements, and means connecting said pump means to said input and output shafts whereby the output of said pump will be proportional to the differential speeds between said shafts.

DESCRIPTION OF THE PREFERRED EMBODIMENT

Figure 1:
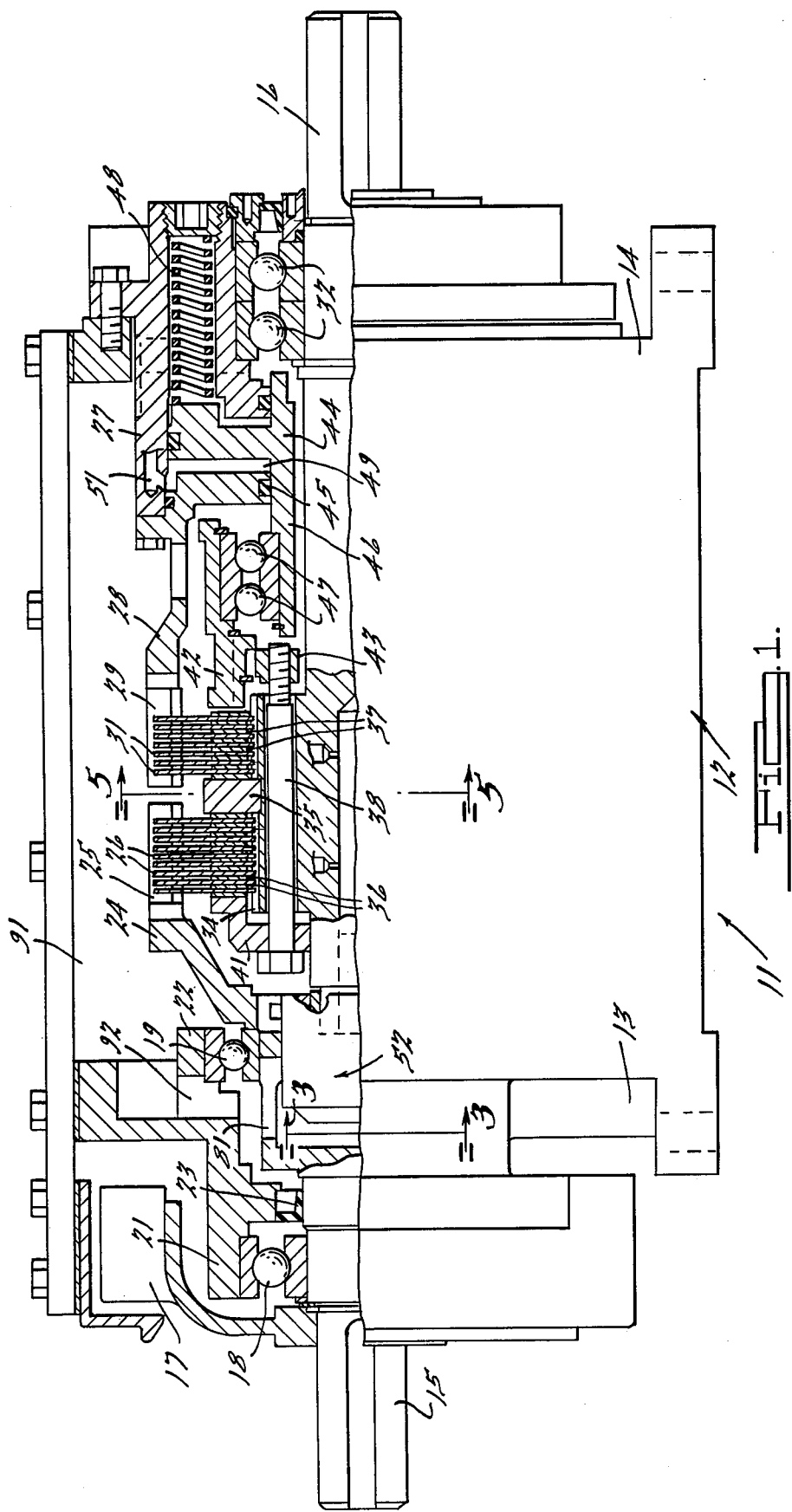
FIG. 1 is a side elevational view, partly sectioned, of the clutch-brake unit.

The clutch-brake unit is generally indicated at 11 in FIG. 1, and since its basic operation is similar to that disclosed in the aforementioned patent, it is only necessary here to describe the basic components which make up the assembly. The unit has a housing generally indicated at 12 with end walls 13 and 14, these end walls respectively supporting an input shaft 15 and an output shaft 16. The shafts are coaxial and rotatably supported by the end walls for independent rotation. Fan blades 17 are secured to the input shaft and will circulate cooling air past housing 12.

Input shaft 15 is supported by bearings 18 and 19 supported by portions 21 and 22 respectively of end wall 13. An oil seal 23 is disposed between these bearings. The input shaft has an inner enlarged portion 24 with axially extending and circumferentially spaced drive lugs 25. A plurality of annular friction clutch plates 26 are keyed to these drive lugs and extend radially inwardly therefrom.

An end plate assembly 27 is fixed to end wall 14 and extends into the housing. An annular bracket assembly 28 is secured to this end plate assembly and carries circumferentially spaced and axially extending drive lugs 29. These drive lugs are axially spaced from drive lugs 25 and carry a plurality of brake plates 31 which, like plates 26, are of annular shape and extend inwardly from the drive lugs. Output shaft 16 is supported in end plate assembly 27 by bearings 32 and extends through bracket assembly 28, brake plates 31 and clutch plates 26. Within the plates, shaft 16 has an enlarged portion 33 with external splines 34 (FIG. 5), a split-ring member 35 being mounted on an intermediate section of enlarged portion 33. A series of clutch friction discs 36 with internal spline formations complementary to formations 34 are splined on enlarged portion 33 of the output shaft to one side of ring 35. A second series of brake friction discs 37 having formations identical with discs 36 are disposed in splined engagement with shaft portion 38 on the opposite side of ring 35 from discs 36. Discs 36 are interposed between plates 26 and discs 37 between plates 31.

The means for simultaneously compressing either the clutch plates 26 or the brake plates 31 against their respective discs comprises a plurality of screws 38 and rods 39 slidably disposed in bores formed in shaft portion 33. Screws 38 are fixed to a clutch actuating member 41 which coacts with the facing side of ring 35 to clamp the clutch plates together. Rods 39 are secured to a brake actuating assembly 42 facing the other side of member 35 so that the brake plates may be caused to grip their interposed discs. Rods 39 are adapted to abut screws (not shown) in member 41 and in a member 43 into which screws 38 are threaded. Rods 39 act as spacer means for axially spacing members 41 and 43 and for controlling the gap or spacing of the parts.

A piston 44 is slidably mounted in end plate assembly 27, bracket assembly 28 carrying a seal 45 which engages an annular extension 46 of this piston. Brake actuating assembly 42 is rotatably mounted on this extension 46 by bearings 47. A plurality of helical coil compression springs 48 is disposed within end plate assembly 27 and engages one side of piston 44 to urge the piston to the left in FIG. 1. This will cause brake plates 31 to engage discs 37 to brake output shaft 16, at the same time disengaging clutch plates 26 from discs 36. A fluid chamber 49 is formed on the other side of the piston, bounded by end plate assembly 27 and bracket assembly 28. A fluid supply conduit shown partially at 51 is adapted to supply pressurized fluid to chamber 49, causing piston 44 to move to the right against the action of springs 48. This will cause clutch plate 26 to engage friction discs 36 so that input shaft 15 drives output shaft 16. At the same time brake plates 31 will become disengaged from discs 37.

In operation of the clutch-brake unit as thus far described, when it is desired to engage the clutch, pressurized air is introduced into chamber 49, shifting piston 44 to the right and causing clutch plates 26 to grip clutch friction discs 36. Initially, the clutch friction discs will be stationary while the clutch plates rotate, so that there will be relative deceleration between the clutch plates and discs as they achieve the same rotational speed. Simultaneously, brake plates 31 will release brake discs 37. Here there will be a relative acceleration between the brake plates and discs during the releasing movement.

When it is desired to stop output shaft 16, pressure in chamber 49 is released and springs 48 will urge piston 44 to the left. Clutch plates 26 will release clutch friction discs 36 so that there will be relative acceleration between these members. Brake plates 31 will engage brake discs 37, causing relative deceleration between these members.

Figure 4:
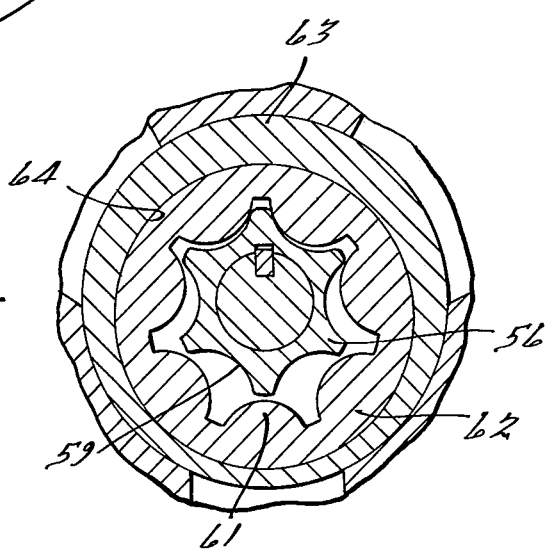
FIG. 4 is a fragmentary cross-sectional view in elevation taken along the line 4—4 of FIG. 2 and showing the inner and outer rotors and the reversing ring for the pump.

It has been found that these transient portions of the operating cycle which have maximum acceleration and deceleration between the plates and discs require sufficient oil between the friction plates and discs so that the kinetic energy may be properly transmitted by "shearing" the oil, and satisfactory cooling of the parts may be accomplished. According to the present invention, a pump generally indicated at 52 in FIG. 1 is provided for accomplishing this purpose and is so constructed and arranged as to supply cooling fluid at a rate proportional to the differential speed between input and output shafts 15 and 16. Preferably, the pump is of the type known as a Gerotor pump such as is manufactured by Brown and Sharpe Manufacturing Co., North Kingstown, R.I. Input shaft 15 has an enlarged annular portion 53 between bearings 18 and 19, output shaft 16 having a spindle portion 54 secured thereto by set screws 55 and concentrically disposed within portion 53. Pump 52 is located in the annular space formed by these two shaft portions. The pump comprises an inner rotor 56 secured by a key 57 and a retaining ring 58 to spindle 54. Inner rotor 56 is splined; that is, it has a plurality of concave portions 59 around its periphery as seen in FIG. 4, and these coact with the lobes 61 of an outer rotor 62 to form pump chambers of varying sizes as the parts rotate. The cylindrical outer surface of outer rotor 62 is rotatably supported by a reversing ring 63. Bore 64 of reversing ring 63 is eccentric with respect to the common axes of spindle 54 and inner rotor 56, and the dimensions of the parts are such that when both rotors 56 and 62 are rotating on their respective axes the chambers formed by their facing surfaces will become larger during one-half of the rotation and smaller during the next half. The radial positions of the minimum and maximum sizes of the chambers will depend on the angular position of the eccentricity of rotor 62 which in turn depends on the rotational position of ring 63. In FIG. 4, for example, with the rotational axis of rotor 62 below that of rotor 56, and with the parts rotating clockwise, the pump chambers will have a minimum size at the top of the rotation and a maximum size at the bottom. Thus, an arcuate inlet port located in the area where the chambers are enlarging will feed fluid to the chambers, and a separate outlet port in the area of decreasing chamber size will receive this fluid.

An annular cartridge 65 is secured to a raised surface 66 on the inside of input shaft portion 53 and extends axially to opposite sides thereof. A bushing 67 is secured to a portion of cartridge 65 which surrounds a reduced portion 68 of output shaft 16. Bushing 67 is secured to cartridge 65 by a dowel 69. The reversing ring 63 is rotatably mounted in bore 71 of cartridge 65 which is concentric with the common axis of shafts 15 and 16. Ring 63 is freely rotatable within bore 71 but has a slot 72 around 180° of its periphery which faces a shoulder 73 on cartridge 65 carrying a stop pin 74. The stop pin is disposed in slot 72 and a simple friction drive exists between outer rotor 62 and the reversing ring. Thus, when the direction of rotation of rotors 56 and 62 is reversed, ring 63 will be rotated 180°, thus shifting the eccentric axis by that angular distance and maintaining the direction of flow unchanged regardless of the drive reversal.

Figure 3:
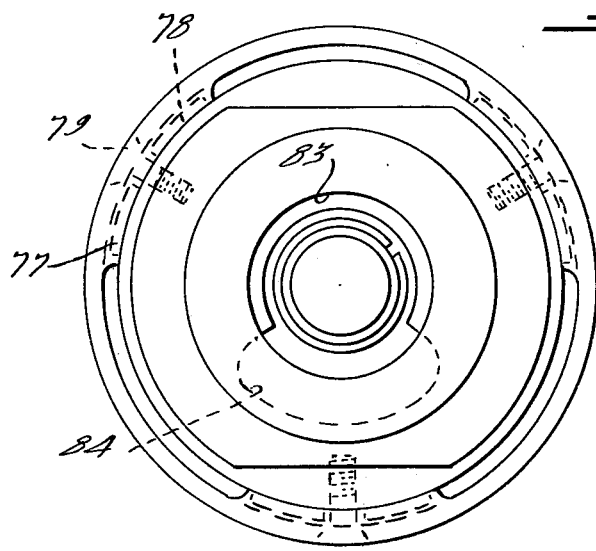
FIG. 3 is a fragmentary elevational view taken along the line 3—3 of FIG. 1 and showing the location of the inlet port and the mounting of the pump plug in the cartridge.

An end portion 75 of cartridge 65 opposite the end portion which carries bushing 67 carries a plug 76 for the pump. A bayonet-slot type of connection is provided between plug 76 and cartridge 65, in the form of circumferentially spaced inwardly extending arcuate portions 77 on cartridge 75, and outwardly extending arcuate portions 78 on plug 76. The plug is assembled in the cartridge by inserting its portions 78 into the spaces between portions 77, and then rotating the plug until the arcuate portions of the two parts are in registry, as seen in FIG. 3. A plurality of bolts 79 passing through cartridge portion 75 are threadably mounted in plug 76 to secure the parts together.

Figure 2:
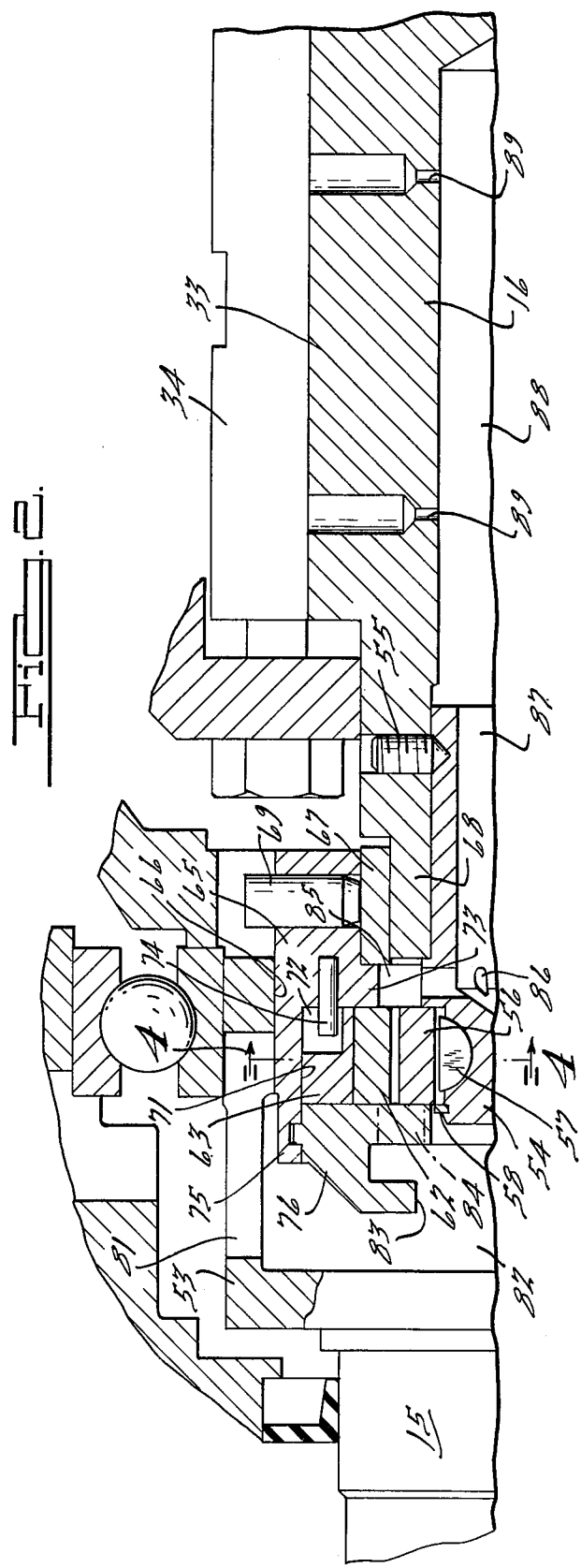
FIG. 2 is an enlarged fragmentary cross-sectional view showing the pump mounted between the input and output shafts, as well as the oil passages in the output shaft leading to the location of the plates and discs, the inlet port of said pump being shown angularly out of position for purposes of clarity.
Figure 5:
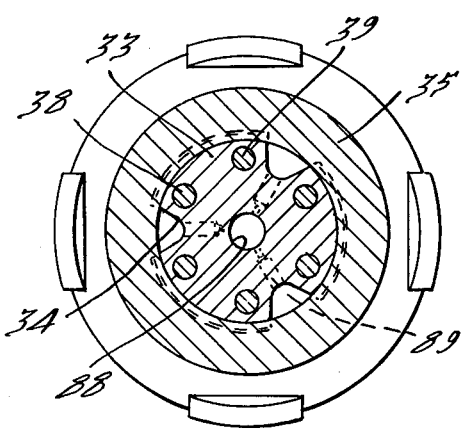
FIG. 5 is a fragmentary cross-sectional view in elevation taken along the line 5—5 of FIG. 1 and showing the oil passages through the output shaft.

Portion 53 of input shaft 15 is provided with a plurality of circumferentially spaced openings 81 for the passage of oil, these openings leading to a chamber 82 within portion 53. Plug 76 has a central opening 83 leading from chamber 82 to an arcuate inlet port 84; it should be noted that in FIG. 2, this inlet port is shown 180° out of position as compared with its position in FIG. 3, for the purpose of illustrating the oil flow in FIG. 2. Port 84 leads to rotors 56 and 62, and an arcuate outlet port 85 in cartridge 65 is formed on the other side of these rotors. A plurality of radially inwardly extending passages 86 lead from outlet port 85 to an axial passage 87 in spindle 54. An axial passage 88 is provided in output shaft 16 contiguous with passage 87 of the spindle. A plurality of axially spaced passages 89 in portion 33 of shaft 16 extend radially outwardly from passage 88 to the spline portions 34, as seen in FIG. 5. More particularly, these passages 89 are disposed in the vicinity of the two sets of plates and discs, namely, clutch plates 26 and discs 36, and brake plates 31 with discs 37.

In operation, assuming an initial condition in which piston 44 is in its rightward position with the input and output shafts clutched together and rotating at the same speed, the entire pump 52 including cartridge 65 and plug 76 will be rotating at the same speed as the shafts. Therefore, since the eccentric position of outer rotor 62, and ports 84 and 85, rotate at the same speed as inner rotor 56, there will be no pumping action.

If piston 44 is moved to the left, the initial movement will start separation of clutch plates 26 from friction discs 36. Shaft 16 will begin to slow down as brake plates 31 engage discs 37. There will thus be increasing relative rotation between the eccentric axis of outer rotor 62 and the axis of inner rotor 56, the inner rotor becoming stationary as shaft 16 comes to a halt. This will cause oil to be pumped from chamber 82 through port 84 and the pump rotors to outlet port 85. The oil will flow through passages 86 to axial passages 87 and 88 and thence outwardly through passages 89 to the external splines 34 of output shaft portion 33. The oil will thus be delivered to both the clutch and brake elements, namely, the plates and discs, and assist in transmitting the loads by the "shearing" action of the oil as well as performing a cooling function. The oil delivery will occur during the period of relative acceleration or deceleration of the elements, when it is most needed.

After shaft 16 comes to a halt by being braked, and shaft 15 continues to rotate, oil will continue to flow through the passages, returning from the housing chamber 91 outside of the clutch and brake elements through passages 92 in end wall 13 and passage 81 of input shaft portion 53 to chamber 82.

When it is desired to again connected shafts 15 and 16, piston 44 will be moved to the left. During the time that there is still relative rotation between shafts 15 and 16, pump 52 will continue to operate as before, delivering oil to the clutch and brake elements which are being subjected to relative acceleration or deceleration. After the input and output shafts are securely clutched together, the operation of pump 52 will cease.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An oil-cooled drive assembly comprising a housing, input and output shafts extending from opposite sides of said housing, coacting drive elements within said housing and operative to drivingly connect said input and output shafts, pump means for supplying cooling fluid to said drive elements, said output shaft having a portion overlapping an end portion of said input shaft, said pump having a first element connected to one of said overlapping shaft portions and a second element connected to the other overlapping portion whereby the output of said pump will be proportional to the differential speeds between said shafts and said pump includes means movable in response to a change in the direction of rotation of said input shaft so as to maintain a constant direction of flow of said oil within said clutch-brake unit.

2. An oil-cooled drive assembly according to claim 1, said pump means being a Gerotor type pump with an inner recessed rotor connected to one of said shafts, an outer lobed rotor meshing with said recessed rotor, a ring rotatably supporting said outer rotor on an axis eccentric to that of the inner rotor, and means connecting said ring to the other shaft.

3. In a clutch-brake unit of the type having a housing, aligned input and output shafts extending from opposite sides of said housing, a series of clutch plates on said input shaft, a series of brake plates secured to said housing, clutch and brake friction discs carried by said output shaft disposed between the clutch and brake plates respectively, and axially shiftable means for alternately engaging said clutch or brake plates with their respective discs, the improvement comprising means for delivering oil to said plates and discs comprising a pump within said housing, and means connecting said pump to said input and output shafts whereby the output of said pump will be proportional to the differential speeds between said shafts and said pump includes means movable in response to a change in the direction of rotation of said input shaft so as to maintain a constant direction of flow of said oil within said clutch-brake unit.

4. A clutch-brake assembly according to claim 3, said output shaft extending through said plates and discs and having a portion overlapping an end portion of said input shaft, said pump having a first element connected to one of said overlapping shaft portions and a second element connected to the other overlapping portion.

5. A clutch-brake assembly according to claim 4, said overlapping portion of the output shaft comprising a spindle disposed within a portion of said input shaft, a chamber formed by said overlapping portion of the input shaft, an inlet port for said pump connected to last-mentioned chamber, an outlet port for said pump, an axial passage in said output shaft, radial passages leading from said outlet port to said axial passage, and radial passages leading from said axial passage to the vicinity of said plates and discs.

6. A clutch-brake assembly according to claim 5, said output shaft having externally splined portions on which said discs are mounted, said last-mentioned radial passages leading to said splined portions.

7. A clutch-brake assembly according to claim 3, said pump comprising an inner splined rotor connected to one of said shafts, an outer lobed rotor interfitting with said splined inner rotor, and said movable means eccentrically support said outer rotor with respect to the inner rotor.

8. A clutch-brake assembly according to claim 7, said movable means eccentrically supporting the outer rotor comprising a ring, an annular cartridge supporting said ring and secured to said other shaft, and a plug secured to one end of said cartridge and holding said rotors in place.

9. A clutch-brake assembly according to claim 3, said pump comprising a splined inner rotor secured to said output shaft, a lobed outer rotor surrounding said inner rotor, said movable means comprise a reversing ring rotatably supporting said outer rotor on an axis eccentric with respect to the inner rotor, a cartridge mounted within an enlarged portion of said input shaft and rotatably supporting said reversing ring, means limiting rotary shifting of the reversing ring whereby the angular position of the eccentricity of said outer rotor will be changed in accordance with reversals of input shaft rotation to maintain a constant flow direction, a plug secured to one end of said cartridge having an inlet port, and an outlet port in said cartridge.

10. A clutch-brake assembly according to claim 9, said output shaft having an axial passage, radial passage means from said outlet port to said axial passage, and axially spaced radial passages in said output shaft leading outwardly from said axial passage in the vicinity of said plates and discs.

* * * * *